July 24, 1962   C. L. JENCKS   3,046,371
CIRCUIT BREAKER

Filed Dec. 19, 1958   4 Sheets-Sheet 1

INVENTOR.
CHARLES L. JENCKS
BY Robert F. Casey
ATTORNEY

July 24, 1962
C. L. JENCKS
3,046,371
CIRCUIT BREAKER
Filed Dec. 19, 1958
4 Sheets-Sheet 2
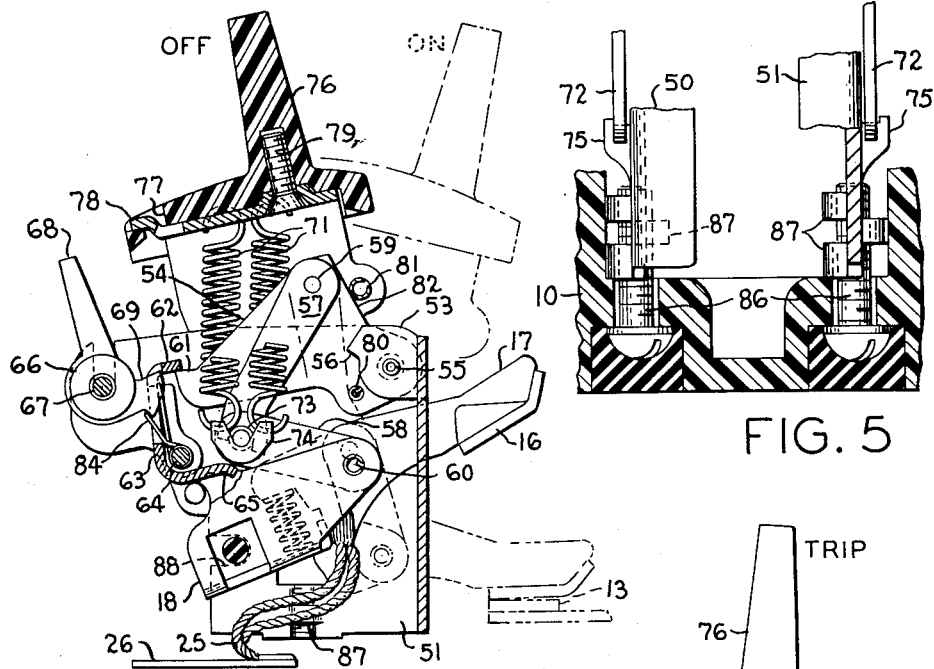
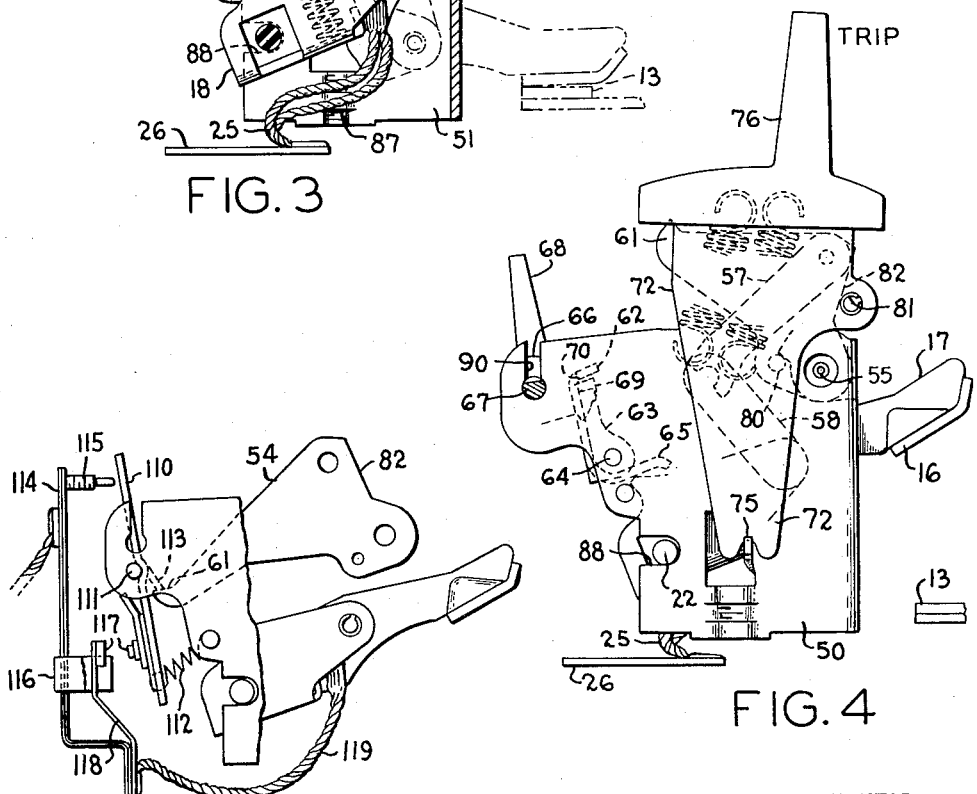
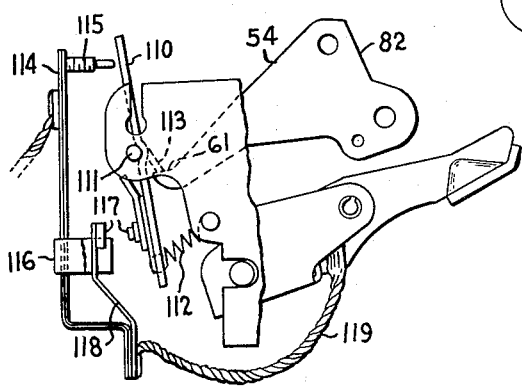
INVENTOR.
CHARLES L. JENCKS
BY Robert P. Casey
ATTORNEY July 24, 1962
C. L. JENCKS
3,046,371
CIRCUIT BREAKER
Filed Dec. 19, 1958
4 Sheets-Sheet 3
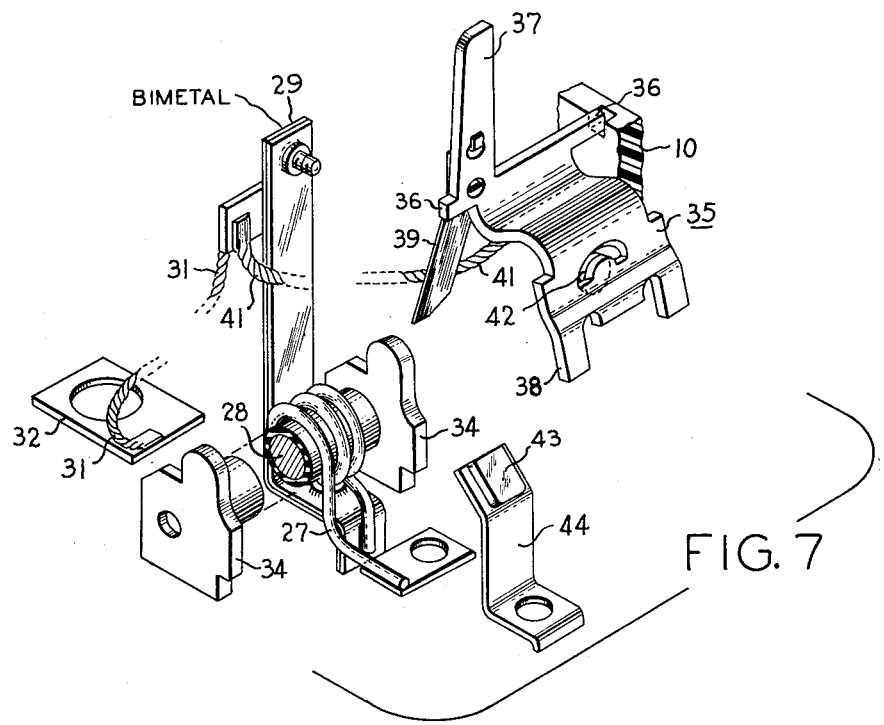
FIG. 7
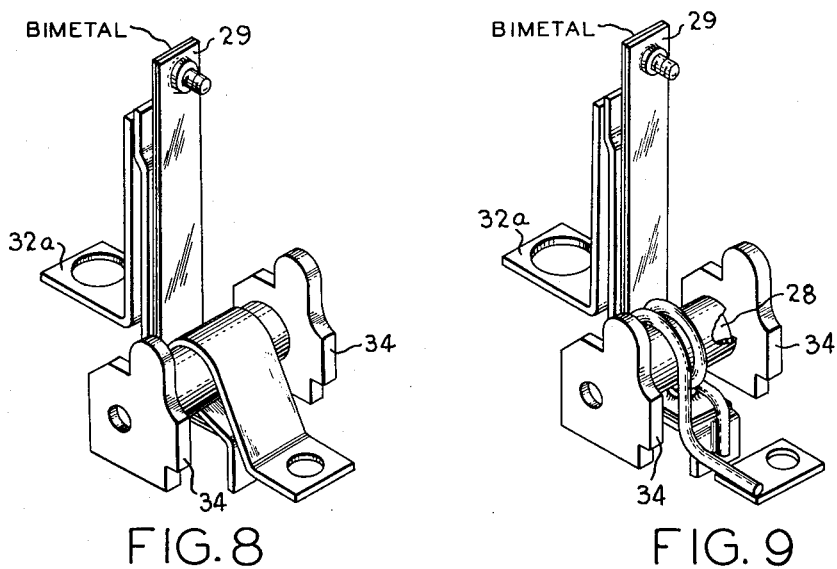
FIG. 8
FIG. 9
INVENTOR.
CHARLES L. JENCKS
BY Robert A. Casey
ATTORNEY July 24, 1962 C. L. JENCKS 3,046,371
CIRCUIT BREAKER
Filed Dec. 19, 1958 4 Sheets-Sheet 4

INVENTOR.
CHARLES L. JENCKS
BY Robert P. Casey
ATTORNEY

United States Patent Office 3,046,371
Patented July 24, 1962

3,046,371
CIRCUIT BREAKER
Charles L. Jencks, Avon, Conn., assignor to General
Electric Company, a corporation of New York
Filed Dec. 19, 1958, Ser. No. 781,766
5 Claims. (Cl. 200—88)

My invention relates to electric circuit breakers and particularly to electric circuit breakers of the type including movable contacts operated by an overcenter-spring type operating mechanism and enclosed in a casing of molded insulating material and suitable for use in industrial and commercial applications.

The increasing volume and complexity of electrical apparatus for the control and protection of electric circuits in industry has created a continuing need for reduction in the size, and conversely an increase in the electrical rating or capacity of such apparatus, and particularly of electric circuit breakers used for the control and protection of electric power circuits.

Since electric circuit breakers are commonly used in assemblies comprising a substantial number of such circuit breakers, by manufacturers of various types of assemblies of electrical equipment, such assemblies have, over the years, become standardized with certain mounting spaces available and with a certain dimensional modulus provided for circuit breakers. Likewise, electrical ratings of circuit breakers have, by custom, become established in certain predetermined steps of voltage and current. Thus, for example, circuit breakers are used in one general class of applications with voltage ratings of 110–125 volts, in another class of applications at 240 volts and in still another large class of applications at 480 and 600 volts. The ampere ratings of such circuit breakers are similarly commonly provided for, in terms of safety code regulations etc., in steps such as 10, 15, 20, 30, 50, 100 amperes etc.

For these reasons, it is not possible to increase the rating or decrease the size of such industrial circuit breakers in convenient small steps. Instead, the rating of a particular circuit breaker if increased at all, must be "jumped" to that of the next largest commonly used rating or, conversely, the size of a circuit breaker must be reduced to that of the next smallest commonly used circuit breaker.

Accordingly, it is a general object of the present invention to provide an industrial type circuit breaker having the physical dimensions of one type of commonly used prior art circuit breaker, for example, a 125 volt, 50 ampere circuit breaker, with a 5,000 ampere interrupting rating, which breaker also has the electrical current carrying and interrupting capacities of the next largest size circuit breaker, even though such next largest size has a voltage rating four to five times as great and a short circuit interrupting capacity at least double, such, for example, as 480 or 600 volt, 100 ampere circuit breaker having a 10,000 amperes interrupting rating.

The higher voltage rating of such breakers requires that the mechanism and the associated parts including the terminals and insulating parts be relatively compact and spaced at proper distances to provide the required oversurface electrical clearance of increased amount as required by the higher voltage. The increased short circuit interrupting capacity requires the use of refractory type contacts, which, in turn, requires relatively higher contact pressure in order to maintain required low contact resistance. This, in turn, requires the provision of an operating mechanism capable of exerting a contact pressure substantially in excess of the prior art type breaker. In addition, such circuit breaker must be provided with a construction which can be readily manufactured and assembled and sold at relatively low cost. All of these overlapping and seemingly incompatible requirements must be met in order to provide a circuit breaker of such increased rating.

Accordingly, it is an object of the present invention to provide an electric circuit breaker including an operating mechanism capable of exerting relatively high contact pressures and occupying a space no greater than prior art breakers of substantially lower rating.

In accordance with the invention, an electric circuit breaker is provided comprising a high contact-pressure, quick-make-and-break operating mechanism including a pair of toggle links having the upper end of the toggle supported on a releasable trip member which is normally held by an intermediate latch member in a first position and which is movable by stored energy in the overcenter springs to a second position to cause automatic opening, in which the releasable trip member is of relatively shorter length and in which resetting of the releasable latch is accomplished by engagement therewith by the knee of the overcenter toggle linkage whereby a more compact high pressure mechanism is possible.

Other objects and advantages of the invention will, in part, be pointed out and, in part, become obvious from the following detailed description and the scope of the invention will be pointed out particularly in the appended claims.

In the drawings,

FIGURE 3 is a side elevation view of the operating mechanism, partially in section;

FIGURE 4 is a side elevation view of the operating mechanism, the parts being shown in automatically opened or "tripped" condition;

FIGURE 5 is a fragmentary sectional view, on enlarged scale, showing the details of mounting of the mechanism side-frames in the insulating casing;

FIGURE 6 is a fragmentary elevation view of a portion of the mechanism of a modified form of the invention adapted for use in a single-pole circuit breaker;

FIGURE 7 is an exploded perspective view of the current responsive tripping mechanism parts of the circuit breaker of FIGURE 1;

FIGURES 8 and 9 are perspective views of current responsive tripping mechanism of modified forms of the invention;

Figure 1:
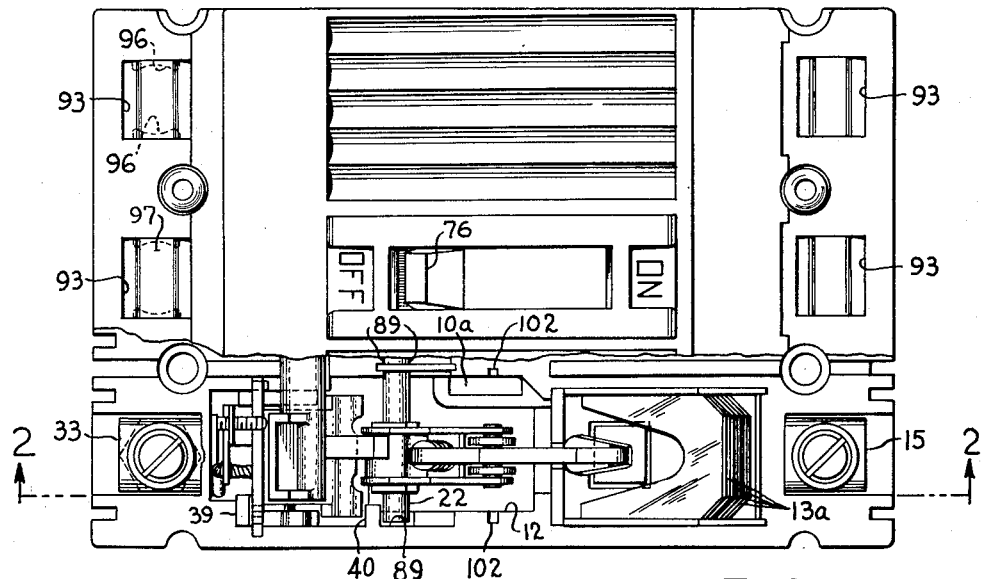
FIGURE 1 is a top plan view of a multipole circuit breaker incorporating the invention, a portion of the casing being broken away.

In the drawings, the invention is shown in FIGURE 1 as incorporated in a three-pole electric circuit breaker comprising an insulating casing including an insulating base portion 10 and an insulating cover portion 11. The base portion 10 includes three elongated side-by-side recesses 12, only one shown, each having a relatively stationary contact 13 mounted therein on a terminal strap 14 which, in turn, is connected to a line terminal 15, positioned in a recess located at one end of the circuit breaker. A relatively movable contact 16 is also provided in each of the chambers 12 and is carried by a two-part contact arm comprising a contact-carrying portion 17 and a mounting portion 18 which are pivotally interconnected by pivot pin 19. The contact-carrying portion 17 is biased for rotation about the pivot pin 19 with respect to the mounting portion 18 by means of a compression spring 20, and such rotation is limited in the clockwise direction by the engagement of the contact-carrying portion 17 with an upwardly bent stop portion 21 carried by the mounting portion 18.

For the purpose of assisting in extinguishing arcs, each chamber 12 is provided with a series of spaced notched plates 13a, and a generally V-shaped grid 13b, through which arc gases are forced to pass in escaping. The grids 13b are formed of relatively thick sheet metal having a plurality of closely spaced holes therein.

The mounting portion 18 of the contact arm is generally U-shaped and has aligned generally square openings in the opposite sides thereof adjacent the bight, through which a common contact cross arm 22 extends, having an enlarged hub portion of generally square cross section and a metallic reinforcing core 23. The portion 18 is attached firmly to the contact cross arm 22 by means of a generally U-shaped fastening member 24 which extends around the contact cross arm and has its ends bent extending through and bent over the bight portion of the member 18.

Clockwise rotation of the contact cross arm 22 therefore causes clockwise rotation of the contact arm assembly and engagement of the movable contact 16 with the stationary contact 13. Following initial engagement of these contacts slight further rotation of the contact cross arm takes place causing slight compression of the spring 20, providing dependable contact pressure.

The contact-carrying portion 17 of the contact arms are each connected by a flexible conductor or braid 25 to a connecting strap 26, which in turn is connected to a relatively rigid magnet winding conductor 27 encircling a magnet core member 28 and having its other end connected to the lower end of an elongated bimetallic strip member 29, which in turn is anchored to the insulating casing by suitable means such as by screw 30.

The upper end of the bimetallic strip 29 is connected by a flexible conductor or braid 31 to a terminal strap 32 which in turn is fixedly attached to a load terminal member 33 positioned in a recess at the load end of the circuit breaker.

The primary current path through the circuit breaker, when the contacts are in the closed circuit position, through one pole thereof, is therefore as follows, beginning with the load terminal 33: from load terminal 33 to conductive strap 32, to flexible conductor 31, through bimetallic strip 29, to magnet winding 27, to connecting strap 26, to flexible conductor 25, to contact-carrying member 17, to movable contact 16, to stationary contact 13, to connecting terminal strap 14, to line terminal 15.

The magnet core 28 has two irregularly shaped pole pieces 34 fixedly attached to the opposite ends thereof. See FIGURE 7. A relatively movable armature 35 is also provided, comprising a member formed out of relatively thin sheet metal material and pivotally supported by engagement of the shoulders 36 thereof which rest upon corresponding shoulders or ledges in the insulating casing of the base 10. The armature member 35 has an upstanding portion 37 for purposes described, an intermediate offset portion, and a depending relatively wide portion 38 which is adapted to be attracted to the pole face portions 34 of the magnet, to cause tripping in a manner to be described.

The armature member 35 is biased for rotation, counterclockwise by means of an elongated leaf-type spring (see FIGURE 1 and FIGURE 7, omitted from FIGURE 2 for clarity) 39 which is rigidly attached to the armature 35 at a point just above the pivot point 36 and which has its lower end extending into engagement with a side ledge portion of the side wall of the insulating casing. The action of the spring 39 is such as to resist movement of the armature member in a clockwise direction and to normally retain it in engagement with a stop surface 40 integral with the insulating casing.

The armature member 35 is therefore supported simply by resting in insulating bearings in the side walls of each chamber and its normal position is determined by insulating surfaces 40 provided in the insulating casing by molding. The normal position of the armature is therefore very closely controlled by the molded-in dimensions of the insulating casing.

In order to protect the bimetallic strip from being adversely affected by short circuit currents, a bypassing circuit is provided comprising a flexible conductor or braid 41 having one end thereof attached to the upper end of the bimetallic strip 29 and having its other end connected to an intermediate portion of the armature 35. A contact 42 is also provided on the armature 35 adapted to coact with a contact 43 mounted on a conducting strap 44 connected to the flexible conductor 25 by means of screw 45.

On the occurrence of high short-circuit currents, the armature member 35 is attracted toward the pole members 34 and the contact 42 touches the contact 43. At this time, therefore, a bypassing circuit is established which shunts the greater portion of such short-circuit current around the bimetallic strip 29 and the magnet 28, directly to the braid 25 and the movable contact.

Figure 5A:
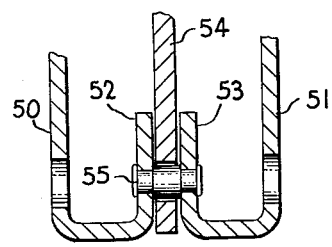
FIGURE 5A is a fragmentary sectional view of a portion of the mechanism of FIGURE 4.

For the purpose of operating the contact cross arm 22 and its associated contact arm assemblies between open and closed circuit positions manually as desired and automatically upon the occurrence of predetermined current conditions in the circuit through such contacts, an operating mechanism is provided, as shown particularly at FIGURES 3–5. The mechanism comprises a pair of opposed side plates 50 and 51, see FIGURE 5, which are generally planar throughout the major portion thereof but have the right-hand portion as viewed return-bent to form a U-shaped section as shown particularly at FIGURE 5A. The return-bent portions 52 and 53 are spaced apart a short distance to receive a releasable trip member 54 and the parts having aligned openings therein through which a pivot pin 55 extends. The pivot pin 55 has its opposite ends headed over to attach these parts permanently together at this point. The return-bent portions 53 each also include a projection 56 for a purpose to be described.

The operating mechanism includes a pair of interconnected toggle links 57 and 58, pivotally connected respectively to the releasable trip member at 59 and to the center contact arm assembly at 60, the pivot pin 60 being the same pivot pin which interconnects the two portions of the center contact arm.

The releasable trip member 54 includes a latching projection 61 which is normally in engagement with a bent-over portion 62 of an intermediate latch member 63, pivotally supported between the side walls of the mechanism on pin 64. The latch member 63 has a lower extension portion 65 for resetting purposes in a manner to be described. The intermediate latch member 63 is normally held in the position shown in FIGURE 3 by the engagement with a latch member 66, pivotally supported between the sides of the mechanism upon a pivot pin 67. The latch member 66 has an upstanding portion 68 adapted to be engaged by a current responsive member such as a bimetallic strip or an electro-magnetic armature, and has a latch-retaining portion 69 which normally engages the edge of the portion 62 by projecting into an opening 70 in the latch member 63.

It will therefore be observed that upward or clockwise rotation force of the releasable trip member 54 exerts a counterclockwise bias on the intermediate latch member 63. The latch member 63 is prevented from rotating in a counterclockwise direction, however, by its engagement with the portion 69 of the latch member 66.

The toggle members 57 and 58 are operated between collapsed and straightened positions to move the movable contact between corresponding open and closed circuit positions, by means of overcenter tension-type springs 71 which are connected between the bight portion of a generally U-shaped handle support member 72 and the knee point 73 of the toggle linkage. The lower ends of the tension springs 71 are connected to the knee point 73 of the toggle linkage by means of a saddle shaped connecting member 74 comprising two interconnected generally U-shaped portions. The handle supporting member 72 is pivotally supported on lugs 75 bent outwardly from the mechanism side portions 50 and 51.

For the purpose of facilitating manual operation of the circuit breaker, a manually engageable handle portion 76 is provided, of insulating material, having an enlarged base portion and an upstanding handle portion. The base portion of the handle member 76 includes an aperture 77 through which a lug portion 78 of the handle support member 72 extends. An anchoring screw 79 extends through the bight portion of the handle support member 72 and into threaded engagement with the handle member 76. It will be observed that the handle member 76 is thereby rigidly and fixedly supported on the handle supporting member 72 by the use of only a single screw. The base portion of the handle member 76 is normally covered by a sliding shield of insulating material as shown particularly in FIGURE 2, which is adapted to close the handle opening in the top portion of the circuit breaker casing in all positions of the operating handle.

The operation of the circuit breaker mechanism will be observed from FIGURE 3 and FIGURE 4. In FIGURE 3, the circuit breaker mechanism is shown in the "off" position in solid lines and in the "on" position in dotted lines. It will be observed that as the handle 76 is moved from the "off" and toward the "on" position, the tension springs 71 pass overcenter across the line of centers of the pins 59 and 73, and cause the upper toggle link 57 to rotate in a counterclockwise direction about its pivotal support on the releasable trip member 54, thereby straightening the toggle linkage and moving the contact arm to closed circuit position. The toggle link 57 is stopped in its forward movement by engagement with a pin 80 carried by the releasable trip member 54.

When the releasable trip member 54 is released by action of a current responsive device as described above, the action of the tension springs 71 is such as to draw the toggle knee pivot pin 73 of the toggle linkage upwardly toward the handle, thereby rotating the trip member 54 clockwise about its pivotal support 55 and moving the contact arms to open position as shown in FIGURE 4. The movement of the releasable trip member 54 clockwise is limited by the engagement of the pin 80 with the projection 56 carried by the portions 52, 53 of the mechanism side plates. In addition, as the trip member 54 starts to rotate clockwise upon being released from the intermediate latch 63, the pin 80, which is in engagement with the forward edge of the upper toggle link 57, moves slightly to the left as viewed in FIGURE 3 and assists in the opening action by starting a collapsing action of the toggle linkage.

As the pin 73 moves upwardly under the influence of the springs 71, it also moves toward the left and thereby changes the line of action of the springs 71 with respect to the pivot point 75 of the handle support member 72 and causes the handle support member 72 to move counterclockwise. The counterclockwise movement of the handle support member 72 is limited by the engagement of pin 81 carried by the handle support member 72 with the edge portion 82 of the releasable trip member 54, in which position, the parts come to rest. Overtravel or "whipping" of the contact-carrying portions 17 of the two outside poles is restricted by the provision of abutments 17a molded integral with the casing cover 11. See FIGURE 2.

In order to reset and reclose the circuit breaker mechanism, the handle is moved manually toward the "off" position during which movement the pin 81 carried by the handle support member 72, engages the edge portion 82 of the releasable trip member 54 and likewise rotates it in a counterclockwise direction until the latch end portion 61 thereof is below the latch retaining portion 62 of the intermediate latch member 63. Slight further counterclockwise movement of the handle 72 causes the knee portion of the toggle linkages 57 and 58 to engage the extension 65 of the intermediate latch member 63, thereby rotating the intermediate latch member 63 in clockwise direction so that the latch retaining portion 62 overlies the latch portion 61 of the releasable trip member. The latch member 66 is then free to rotate slightly counterclockwise under the bias of latch return spring 84 to again retain the latch portion 62 in latching position. The breaker may thereafter be returned to the "on" position.

It will be observed that because of dimensional limitations, the releasable trip member 54 is not long enough, nor is sufficient counter rotation of the handle member 72 possible, to cause resetting of the latch member 63 by means of the end portion of the trip member. Instead, use is made of the knee portion of the toggle linkage to perform this function, thus making possible an extremely compact mechanism.

The side plate members 50 and 51 of the mechanism are retained on the insulating base 10 by suitable means such as by screws 86 which enter into lanced out threaded portions 87 of the side plates. It will be observed that the positioning of the side plates with respect to the insulating base is determined by the lower edge of the side frames, and that no bending-over is necessary to attach these parts. This affords an important advantage, since the dimensions which are determined by stamping out of a piece of metal in the flat condition can be extremely closely controlled, while those involved or affected by bending of the metal cannot be very well controlled. By utilizing side mechanisms which are identical in the stamped or flat condition and mounting them on the insulating base with a blanked edge as the determining dimensional factor, accurate transverse alignment of these parts is assured. This assures also that there will be no tilting or cocking of the mechanism, which would be very undesirable because of the limited space involved, and also makes it possible to use only a single joining member to attach the two-side plate portions of the mechanism together, i.e., pin 55, it being observed that none of the other pins which are positioned between the sides of the casing are headed-over or include retaining elements.

The contact cross arm 22 is pivotally supported by being inserted into open end notches 88 in the side plates 50 and 51. This restrains the contact cross arm from movement vertically toward and away from the back wall of the circuit breaker casing. See FIGURE 4. The contact shaft cross arm 22 is retained from movement horizontally, that is, parallel to the back wall of the circuit breaker by engagement of portions thereof with corresponding vertical bearing portions provided integral with the insulating casing. Such bearing surfaces are shown, for example, in FIGURE 1 at 89 in the outer side wall of the casing and also at 89 in the insulating barrier portion between the two adjacent recesses. This construction greatly simplifies the assembly of the mechanism and the circuit breaker, since it is only necessary to insert the contact cross arm in the notches 87 of the side mechanism plates and then to insert the assembled mechanism into the insulating base of the circuit breaker and to anchor it therein. Thereafter, the contact cross arm is closely retained from movement in all directions by the various bearing surfaces mentioned.

The common trip bar 66 is pivotally supported upon a shaft 67 which is provided with a pair of intermediate non-circular portions which are adapted to fit into the slots 90 in the mechanism side plates and then to be rotated into final position in the enlarged portion of the slots. Thereafter it cannot be removed from its position since it is not possible to rotate the trip member sufficiently after insertion in the circuit breaker casing.

Figure 2:
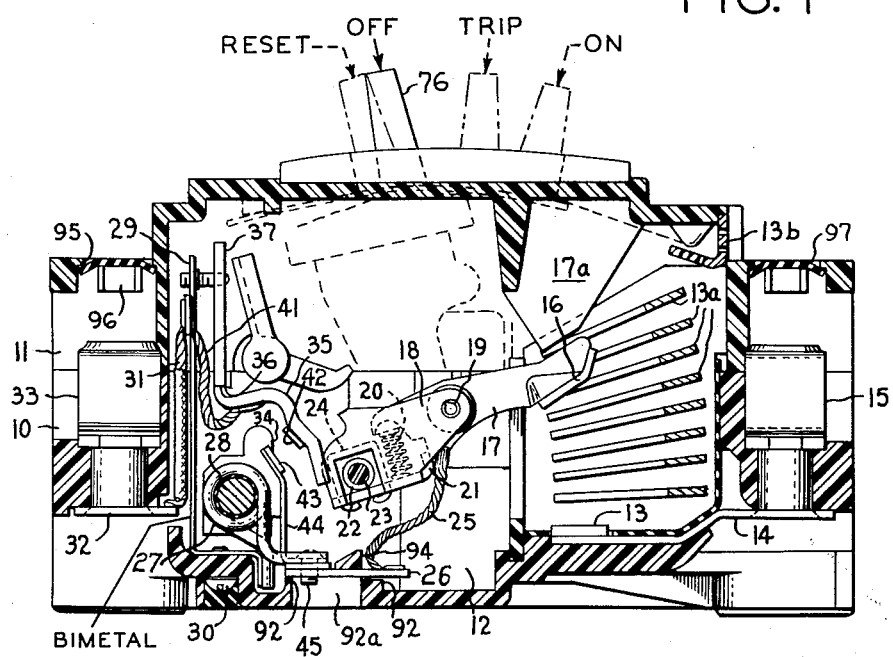
FIGURE 2 is a side elevation view partially in section taken generally on the line 2—2 of FIGURE 1 and showing the primary current path through one pole of the circuit breaker.

Referring to FIGURE 2, it will be observed that the parts comprising the winding 27 of the magnetic trip and the connecting strap 26 connecting to the braid 25 are connected together as described above by the screw 45. Although this screw serves primarily to bolt these conductive members directly together to establish an electrical connection, it also serves to maintain and anchor this end of the magnet winding in place. Thus the conductive strap 26 includes portions overlying portions of the insulating casing, namely, at 92 and an intermediate portion underlying a portion of the insulating casing at 94. This is made possible by providing an opening 92a in the bottom of the casing so that the portion 94 of the casing constitutes a bridge-like portion raised above the general level of the bottom of the insulating casing and under which the strap 26 may be extended. When the parts 26 and 27 are connected together by the screws 45, it will be observed that the parts are all maintained in position as well as being connected together. This mounting between the screws 45 and 30 also serves to retain the entire magnetic trip assembly in position comprising the core 28 and its associated pole pieces 34.

Referring particularly to FIGURES 1 and 2, it will be observed that the circuit breaker casing is provided with extended end portions of the cover 11 thereof which extend over the line and load terminals 15 and 33. Generally square access openings 93 are provided in these extended portions in order to permit the insertion of a screwdriver to tighten the terminals 15 and 33. In order to make possible the ready closure of the openings 93, however, lip portions 95 are provided at each of two opposed sides of the apertures 93 and projections 96, extending inwardly from the other two opposed sides of the aperture. A closure member 97, conforming in outline generally to the apertures 93 and of relatively thin resilient insulating material, is then snapped into position in each of the apertures 93 so as to assume the trapped position shown in FIGURE 2. It has been found that these closure members are securely retained by this construction and that it is virtually impossible to remove them from the top surface of the breaker.

Figure 10:
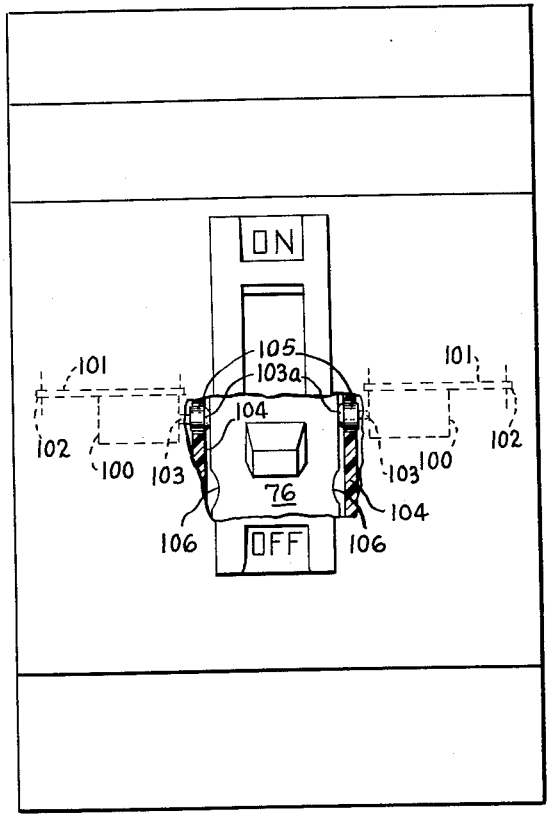
FIGURE 10 is a top plan view of a portion of the circuit breaker of FIGURE 1 showing an auxiliary or "trip alarm" switch in position.

Referring to FIGURE 10, there is also provided, in accordance with the invention, an auxiliary switch 100 which is rigidly attached to a supporting plate 101. The supporting plate 101 is retained in position by portions thereof which extend into slots 102 in opposed side walls of the circuit breaker chamber 12. The switch 100 includes a reciprocating type actuator 103. The barrier portion 104 of the insulating cover 11 is provided with an aperture 105 therein in alignment with the actuator 103, and a sliding actuator extension portion 103a is slidably trapped in the aperture 105, and includes a cam surface inner end which is normally urged into engagement with a side portion of the insulating handle member 76. The insulating handle member 76 has its major portion thereof dimensioned so that when the handle is in either the "on" or the "off" position, the actuator of the switch 100 is held in an inactive position. The insulating handle member 76 is, however, also provided with a recess 106 in the side wall thereof substantially half way between the ends thereof which is disposed to be in alignment with the actuator 103 when the handle is in the "tripped" position as indicated in FIGURES 2 and 4. When the handle is in this position, the extension 103a extends into the recess 106 allowing the switch 100 to assume its closed position, thereby giving a remote indication of the tripped condition of the circuit breaker. By means of this construction, it is unnecessary to add any particular actuating portion to the circuit breaker mechanism in order to actuate such a trip indicating switch, or to have engagement with the releasable trip member 54. The handle 76 is also provided with a recess 106 in both sides thereof so that the trip indicating switch may be mounted in either of the outer chambers 12 as desired. For the purpose of facilitating the introduction of conductors to and from the switch 100 or similar device, "knockout" portions 10a (see FIG. 1) are provided in the bottom wall of the casing base 10, between the central chamber 12 and each of the two outside chambers.

In FIGURES 7–9 I have shown modifications of the trip or current responsive mechanism. In FIGURE 7 there is shown a mechanism which includes a magnetic trip having a winding comprising three complete turns. In FIGURE 8 there is shown a magnetic trip having a winding comprising only a single turn, while in FIGURE 9 there is shown a magnetic trip having a winding comprising two complete turns.

In FIGURE 6 there is shown a modification of the invention which is adapted for use in a single-pole circuit breaker. In this form of the invention, the intermediate latch member 63 is omitted and instead the latch member 110 is pivotally supported on a pin 111 in the side frame members of the mechanism and is biased by a tension type spring 112 in a counterclockwise direction. The latch member 110 includes an intermediate lanced-out latch portion 113 which engages the latching end 61 of the releasable trip member 54. Upon deflection of the bimetallic strip 114, the screw 115 carried thereby engages the upper end of the trip member of the latch 110 and rotates it clockwise, withdrawing the latch 113 from the tripped member 54 and causing tripping. A magnetic trip member is also provided, including a generally U-shaped field piece 116 rigidly attached to the bimetallic strip 114 and adapted to attract the lower end of the latch member 110 as an armature, to likewise cause tripping. In order to provide a bypassing circuit to protect the bimetallic strip 114 in a manner similar to that described above, a pair of shorting contacts 117 are provided, one of which is carried in insulated relation on the latch member 110 and connected by a flexible conductor or braid, not shown, to the upper end of the bimetallic strip 114. The other of the shorting contacts 117 is carried by a resilient conductive strip member 118 which is connected to the conductive braid 119 leading to the movable contact.

While I have shown only specific forms of my invention, it will be readily appreciated that many modifications thereof may be made by those skilled in the art, and I therefore intend by the appended claims to cover all such modifications as fall within the true spirit and scope of the invention.

What I claim as new and desire to secure by Letters Patent of the United States is:

1. An electric circuit breaker comprising a relatively stationary contact, a relatively movable contact, operating mechanism for operating said movable contact between open and closed circuit positions comprising a releasable trip member movable between a latched and a released position, a pair of toggle links interconnected between said movable contact and said releasable trip member and movable between collapsed and straightened positions to move said movable contact between said open and closed circuit positions respectively while said trip member is in said latched position, latch means for retaining said releasable trip member in said latched position and movable between a holding position and a releasing position, current responsive means for causing movement of said latch from said holding to said releasing position, said latch means including a reset portion which when said latch is in releasing position extends into the path of movement of said toggle linkage as said toggle linkage moves to said collapsed position, said toggle linkage including a portion engaging said reset portion after said trip member is moved to said latched position and moving said latch from said releasing to said latching position.

2. An electric circuit breaker comprising an insulating casing, a relatively stationary contact in said casing, a relatively movable contact in said casing, a pivotally supported contact arm connected to move said movable contact between closed and open circuit positions, a releasable trip member pivotally supported in said casing and movable between a latched and a released position, a pair of toggle links interconnected between said contact arm and said releasable trip member and adapted to move between collapsed and straightened positions to move said movable contact arm between open circuit and closed circuit positions respectively while said trip member is in said latched position, means for retaining said trip member in said latched position comprising a pivotally supported latch member movable between a latching and a releasing position, a latching projection carried by said latch member and disposed to line in the path of movement of said trip member when said latch member is in said latching position, said latch member including a second projection on the opposite side of the pivot of said latch member from said first projection and disposed to lie in the path of movement of said toggle linkage when in said collapsed condition while said trip member is in said latched position, whereby said toggle linkage when moving to said collapsed condition engages said second projection after said trip member has passed said first projection and rotates said latch member in a direction to cause said first projection to overlie said latch projection of said trip member.

3. A circuit breaker as set forth in claim 2 wherein said circuit breaker also includes a latch-retaining member separate from said latch member pivotally supported in said casing and including a projection adapted normally to engage and restrain said latch member in said latched position.

4. An electric circuit breaker comprising a casing, a relatively stationary contact supported in said casing, a relatively movable contact pivotally supported in said casing, operating mechanism for operating said relatively movable contact between open and closed circuit positions comprising a releasable trip member movable between a latched and a released position to cause automatic movement of said movable contact to said open position, spring means urging said trip member in a predetermined direction toward said released position when in said latched position, latch means normally restraining said trip member in said latched position comprising a latch member of sheet metallic material having a portion bent over to provide a latching surface adapted to overlie a corresponding latch projection on said trip member, means pivotally supporting said latch member in said casing at a point spaced away from said latch surface, an aperture in said latch member intermediate said pivot point and said latch surface and exposing an edge surface of said latch member adjacent said latch surface extending generally parallel to said predetermined direction of impending movement of said trip member, and a latch retaining member pivotally supported in said casing and including a first projection adapted to extend into said aperture to engage said edge portion of said latch member to restrain said latch member from pivotal movement about its pivotal support in a direction substantially at right angles to said predetermined direction, a second projection on said second latch member adapted to be engaged by a current responsive element to cause rotation of said second latch member about its pivotal support and movement of said first projection out of engagement with said edge portion of said latch member to permit said latch member to rotate away from said trip member to release said trip member for movement toward said released position under the influence of said biasing spring.

5. An electric circuit breaker comprising a casing of molded insulating material, said casing comprising a base having opposed side walls, a bottom wall and an open top wall, a stationary contact in said insulating base, a relatively movable contact supported for movement in said insulating base into and out of engagement with said stationary contact, operating mechanism for operating said relatively movable contact between open and closed circuit positions comprising a releasable member, current responsive means for causing release of said releasable member comprising a relatively stationary magnetic field piece fixedly mounted in said insulating base and an armature movable relative to said field piece, a pair of opposed upwardly opening recesses in said opposed side walls of said insulating base, a pair of outwardly projecting pivot portions carried by said armature and adapted to rest in said recesses to pivotally support said armature therein, at least one inwardly directed shoulder portion on at least one of said side walls of said base, said armature including a portion disposed and arranged to engage said inwardly projecting portion of said side wall to limit pivotal movement of said armature about its pivot in a direction away from said field piece to establish a maximum air gap for said magnet, and spring means normally biasing said armature in a direction away from said magnet to said maximum air gap position.

References Cited in the file of this patent

UNITED STATES PATENTS

| | | |
|---|---|---|
| 1,812,843 | Sachs | June 30, 1931 |
| 2,050,284 | Dorfman | Aug. 11, 1936 |
| 2,072,932 | Wilckens | Mar. 9, 1937 |
| 2,300,884 | Gano | Nov. 3, 1942 |
| 2,345,105 | Dorfman et al. | Mar. 28, 1944 |
| 2,419,125 | Dorfman et al. | Apr. 15, 1947 |
| 2,421,853 | Scott | June 10, 1947 |
| 2,486,300 | Lindstrom et al. | Oct. 25, 1949 |
| 2,487,970 | Horn et al. | Nov. 15, 1949 |
| 2,540,491 | Rowe et al. | Feb. 6, 1951 |
| 2,656,439 | Gelzheiser et al. | Oct. 25, 1953 |
| 2,767,262 | Heintz | Oct. 16, 1956 |
| 2,810,048 | Christensen | Oct. 15, 1957 |
| 2,811,607 | Dorfman et al. | Oct. 29, 1957 |
| 2,816,987 | Hagdahl | Dec. 17, 1957 |
| 2,849,581 | Bingenheimer | Aug. 26, 1958 |
| 2,890,306 | Rypinski et al. | June 9, 1959 |
| 2,892,054 | Walker et al. | June 23, 1959 |
| 2,937,251 | Cellerini | May 17, 1960 |